H. E. BROWN.
ATTACHMENT FOR ADDING MACHINES.
APPLICATION FILED JAN. 31, 1913.
1,172,931.
Patented Feb. 22, 1916.
3 SHEETS—SHEET 2.
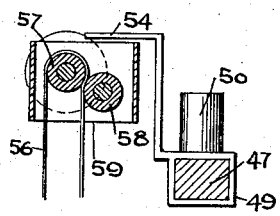
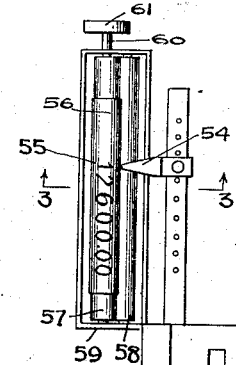
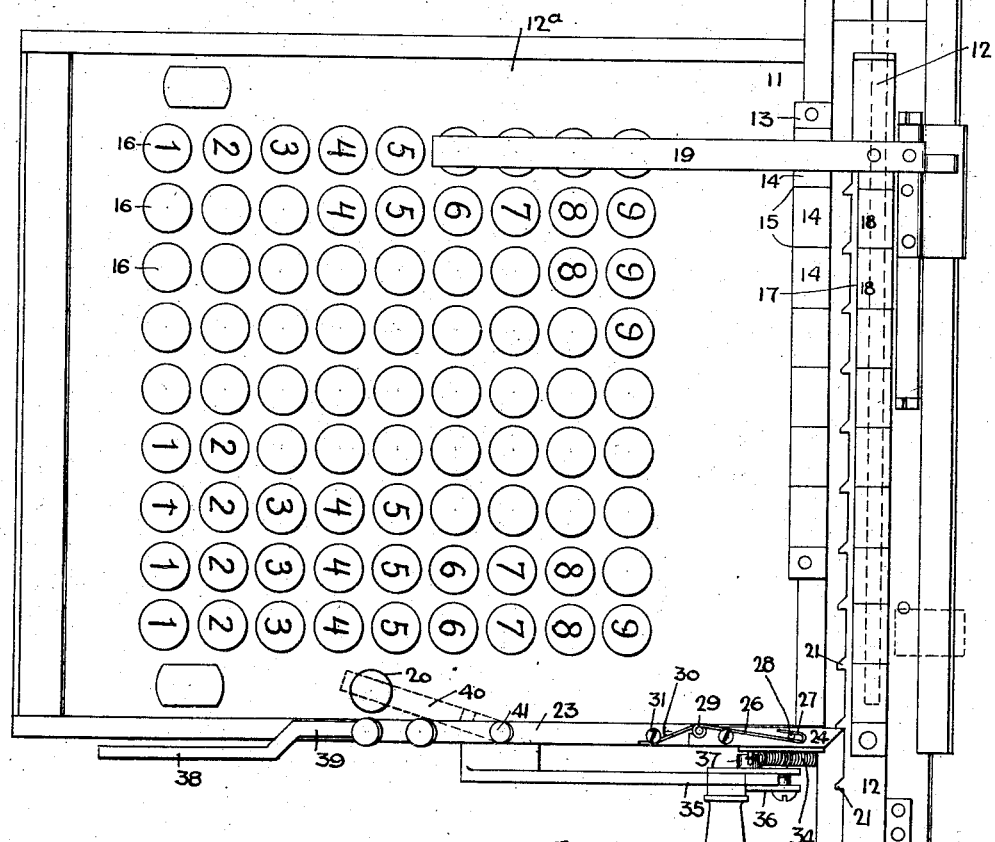
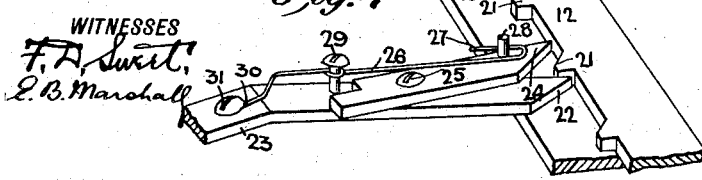
WITNESSES
F. D. Swift
E. B. Marshall
INVENTOR
Hugh E. Brown
BY
ATTORNEYS H. E. BROWN.
ATTACHMENT FOR ADDING MACHINES.
APPLICATION FILED JAN. 31, 1913.
1,172,931.
Patented Feb. 22, 1916.
3 SHEETS—SHEET 3.
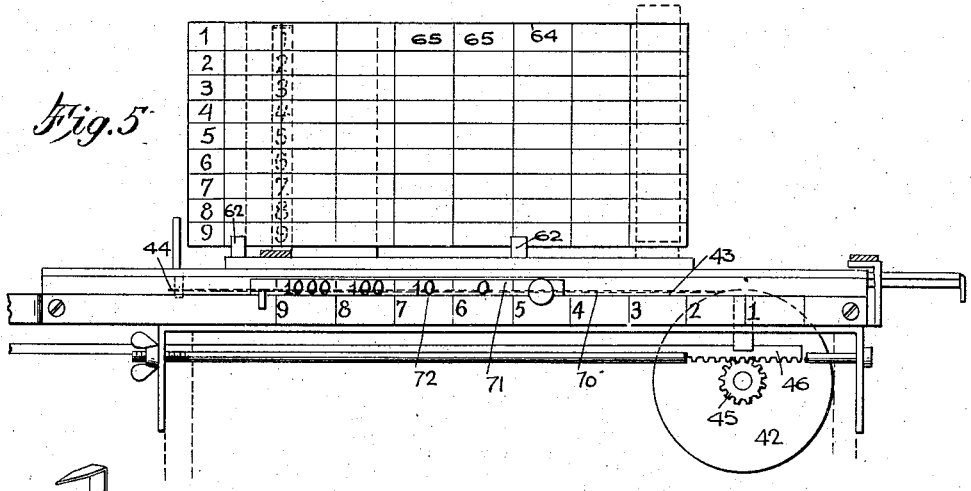
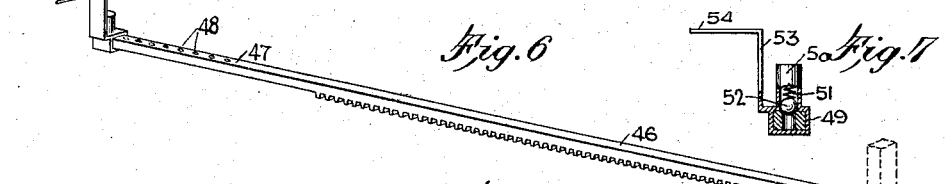
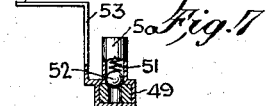
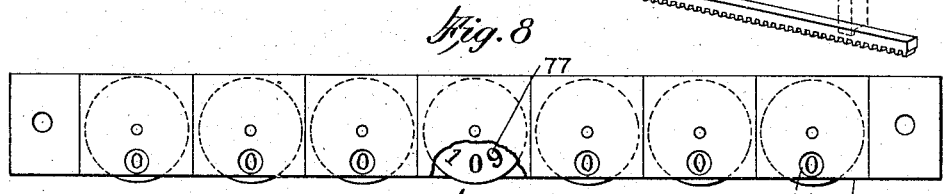
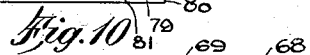
WITNESSES
F. D. Sweet
E. B. Marshall
INVENTOR
Hugh E. Brown
BY
ATTORNEYS

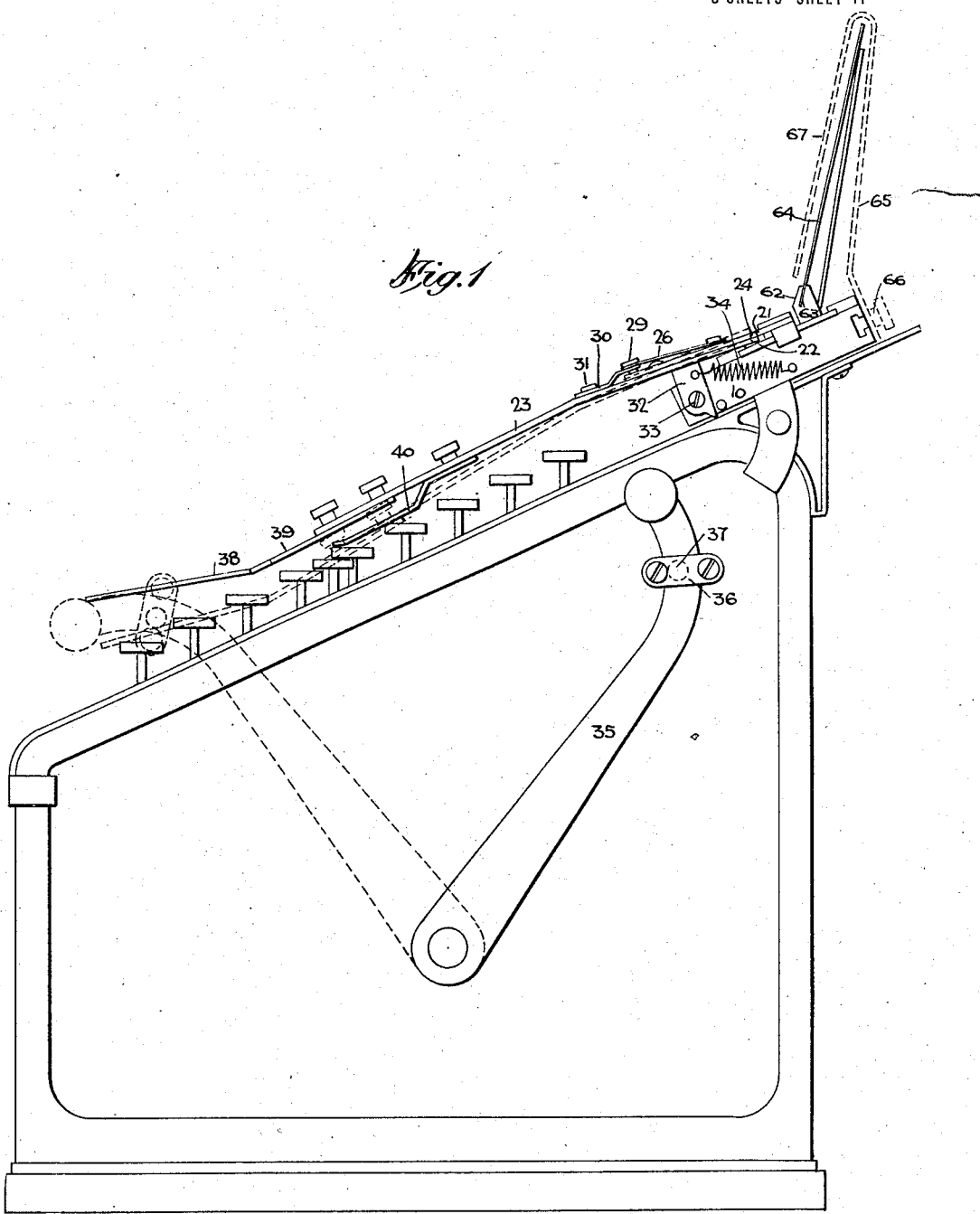

UNITED STATES PATENT OFFICE.

HUGH E. BROWN, OF BROWNS STATION, MISSOURI.

ATTACHMENT FOR ADDING-MACHINES.

1,172,931.  Specification of Letters Patent.  Patented Feb. 22, 1916.

Application filed January 31, 1913. Serial No. 745,414.

*To all whom it may concern:*

Be it known that I, HUGH E. BROWN, a citizen of the United States, and a resident of Browns Station, in the county of Boone and State of Missouri, have invented a new and Improved Attachment for Adding-Machines, of which the following is a full, clear, and exact description.

My invention has for its principal object to provide an attachment for adding machines which will: first, facilitate the process of using a kind of numerical table with such machines (for example, the table used in the process of finding the respective products of a rate by each of a list of members); second, serve as a guide to the operator in the process of multiplication as it may be performed on the Burroughs type of adding machines.

The accompanying drawings show my attachment as designed primarily for use with the Burroughs type of adding machine.

Briefly, my invention consists in providing means to indicate the appropriate numerical orders of the adding machine in which numbers should be registered, especially the numerical order of the adding machine in which the left hand digit should be registered.

A carriage is provided and for operating this carriage, I provide a releasing means which permits the carriage to move a predetermined distance, under the influence of another means, at each movement of a lever. This lever may be operated by the handle of the adding machine, when desired, as in the process of using a numerical table. In this said process as hereinafter explained each result is obtained without the repetition of a number in identical orders of the adding machine. The lever is also provided with a member which may be adjusted for pressing down the releasing button of the adding machine, for use when the lever is operated manually as in the process of multiplication. The process of using a numerical table to find the respective products of a rate by each of a list of numbers, differs from the process of multiplication. In the first of said two processes, the lever of my attachment may be operated by means of the adding machine handle. In the second process (multiplication) the lever of my attachment is operated manually.

Additional objects of the invention will appear in the following complete specification, in which the preferred form of the invention is disclosed.

In the drawings similar reference characters refer to similar parts in all the views in which—

Figure 1 is a side elevation of an adding machine, provided with my attachment; Fig. 2 is a plan view of Fig. 1; Fig. 3 is an enlarged sectional view on the line 3—3 of Fig. 2; Fig. 4 is an enlarged perspective view, showing the releasing means operated by the lever; Fig. 5 is a front view of my attachment, with parts broken away to show the operating means; Fig. 6 is a perspective view of the rack bar, which is operated by the pinion, which rotates with the spring drum; Fig. 7 is an enlarged section view showing the means for holding the finger in position on the rack bar; Fig. 8 is a view of one of the members secured to the attachment, readily indicating the multiplier or multiplicand when multiplying; Fig. 9 is a cross sectional view of Fig. 8; and Fig. 10 is a plan view of a keyboard, which is secured to move the carriage of the attachment.

By referring to the drawings, it will be seen that the frame 10 of my attachment is secured to the back 11 of the adding machine 12$^a$, and mounted to travel transversely of this frame 10, there is a carriage 12. Secured to the frame 10, there is a plate 13, which is divided into spaces 14 between lines 15, these spaces 14 being in alinement with the columns of keys 16 of the adding machine 12$^a$. There is also secured to the carriage 12 a similar plate 17, which is divided into similar spaces 18, which are normally in alinement with the spaces 14, and with the columns of keys 16 of the adding machine. However, it will be seen that with the movement of the carriage 12, these spaces 18 will be moved relatively to the spaces 14, and across the machine, means being provided which will hereafter be described, which gives the carriage 12 an intermittent movement, the carriage at the end of each movement with the spaces 14 and with the rows of keys 16.

Secured to the carriage 12 and extending therefrom, there is a finger 19, which projects over the plate 13, in the direction of the keys of the adding machine 12$^a$. It will therefore be seen that when the operator desires to multiply a certain number by another number, the digits of the multiplier may be marked one in each of the spaces 14, and the digits of the multiplicand may be marked one in each of the spaces 18. The left hand figure of the multiplier is in that space 14 that is in alinement with that column of adding machine keys, whose numerical order is represented by a number one less than the number representing the sum of the number of numerical orders in both multiplicand and multiplier. That the appropriate space 14, for such left hand figure may be readily determined, the scale plate 71 is provided (see Fig. 5) with the scale 9—8—7—6—5—4—3—2—1 for the attachment used with a nine order adding machine. The figure "1" of the scale being in alinement with the lowest order of the adding machine keys, the figure "2" in alinement with the next lowest order, and so on consecutively from right to left, one scale number for each numerical order of the adding machine keys. Then if the carriage of the attachment be in position for the finger 19 to be over that figure of the scale, that represents the sum of the number of the numerical orders in both multiplicand and multiplier, the space 14 immediately to the right of the finger 19 is the space in which to mark the left hand figure of the multiplier. The other figures of the multiplier to be marked on each in their natural order in the spaces 14 to the right.

*Example.*—Multiplicand 5463, multiplier 27; the number of numerical orders in the multiplicand is four (4), in the multiplier two (2), total six (6); therefore, the left hand figure (2) of the multiplier (27) should be marked in the 5th (6—1) or ten thousands order of adding machine keys. Or, using the scale, let the finger 19 be over the scale figure "6" (representing the sum of the number of numerical orders in both multiplicand and multiplier). Then mark the left hand figure (2) of the multiplier (27) in that space 14, immediately to the right of the finger 19. Said space 14 being in alinement with the 5th (ten thousands order) of the adding machine keys.

Before beginning the actual multiplication, the extension 39 is moved out of the position shown in Fig. 2, so that the set off portion 38 cannot be engaged by the stud 37. Then the operation of the handle 35 of the adding machine cannot operate the lever 23. Then with the repeat key of the adding machine fastened down, and the bracket 40 in the position shown in the drawing Fig. 2, and the finger 19 to the left of the left hand figure of the multiplier, the operator commencing at the right of the finger 19, presses down the keys in the columns 16 to indicate the number of the multiplicand, the left hand figure of the multiplicand being indicated first and in the column of keys 16 to the right of the finger 19, and the other digits of the multiplicand being indicated on the keys in the customary manner; the digit of the multiplier in the space 14 at the right of the finger 19 showing how many times the operating handle of the adding machine must be actuated. When the handle has been actuated the required number of times, the operator with his finger presses down the lever 23, thus permitting the carriage 12 to move one space to the right, and also causing the bracket 40 (fastened to the lever 23) to press the release button 20 of the adding machine. Now the finger 19 covers the left hand figure of the multiplier and the next highest order of the multiplier is seen immediately to the right of said finger. If the figure in the last named order is significant, the figures of the multiplicand are struck on the keys, the left hand figure thereof in the column 16 immediately to the right of the finger 19 and the operating handle of the adding machine is actuated the number of times indicated by the digit in the space 14 immediately to the right of the finger 19. Again the operator presses his finger on the lever 23, thus permitting the carriage 12 to move one space to the right and also causing the bracket 40 to depress the release key 20. If there were (as in the example cited above) only two figures in the multiplier, the total of the amounts registered is now taken for the product. In this way my attachment is used with the Burroughs machine in the process of multiplication.

The carriage 12 has projecting teeth 21, which are engaged by the tooth 22, on the lever 23, and also by the tooth 24, which is pivoted at 25 to the said lever 23. The tooth 24 is held yieldingly by means of the spring 26, which has a loop 27, disposed around the stud 28 on the said tooth 24. This spring 26 is wound around a screw 29 on the lever 23, and has a terminal 30, secured to the lever 23 by means of the screw 31. The tooth 22 is normally disposed below the horizontal plane at the bottom of the teeth 21, and the tooth 24 normally engages one of the teeth 21. However, when the lever 23 is actuated, the teeth 22 and 24 are raised, the tooth 22 being raised sufficiently to engage the tooth 21 of the carriage 12 with which has been engaged the tooth 24, and the tooth 24 being raised above the said tooth 21, when the tooth 24 is freed from the tooth 21. The spring 26 serves to move the tooth 24 by the tooth 21, with which it has been engaged, and to the position shown in Fig. 4 of the drawings. When the lever 23 is again disposed in normal position, and the teeth 22 and 24 are lower, the tooth 22 is freed from engagement with the tooth 21, and the carriage is moved under the influence of a means which will be hereafter described, to the position where the tooth 24 will engage the next tooth 21 of the carriage 12.

Secured to the lever 23 there is a bracket 32, which is pivoted to the frame 10 at 33, this bracket 32 being held yieldingly in normal position by means of the spring 34, which connects the bracket 32 with the frame 10. To the operating lever 35 of the adding machine may be secured a clamp 36 having a stud 37, which is adapted to engage the set off portion 38 of the extension 39, pivoted to the lever 23, at 23ª. The extension 39 may be held relatively to the lever 23 by the set screw 23ᵇ, which meshes in a threaded orifice in the lever 23 and is adapted to engage the extension 39. When the set screw 23ᵇ is unscrewed, the extension 39 may be turned on its pivot 23ª relatively to the lever 23 to a position where it will not be engaged by the stud 37 on the clamp 36 carried by the operating lever 35. The bracket 40 is movable on its pivot relatively to the lever 23. Before using the adding machine, the operator may with his finger push the bracket 40 relatively to the lever 23, so that it will engage the release key 20 when operated, or if the bracket is in position to engage the release key 20, the operator may push the bracket 40 out of said position. The bracket 40 is pivoted close to the lever 23 and is held in position after adjustment by friction therewith. It will therefore be seen that with this arrangement when the operating lever 35 is actuated, the stud 37 will engage the set off portion 38 of the extension 39 of the lever 23, to operate the said lever.

A bracket 40 is pivoted to the lever 23 at the point 41, and is adapted to be disposed in position to engage the release key 20, and is for use when the lever 23 is operated manually.

The carriage 12 is moved transversely of the frame 10 when the teeth 21 are freed from the teeth 22 and 24 by the spring drum 42, which is journaled in bearings in the frame 10. Wound on this spring drum 42 there is a strap 43 which is secured to the carriage 12, at 44, the carriage being moved by this spring drum 42, and this strap 43, as soon as the teeth 21 of the carriage have been freed from the teeth 22 and 24 in the manner described. Secured for rotating with this spring drum 42 there is a pinion 45, which meshes with a rack 46 which slides in guideways in the frame. The end 47 of this rack 46 is provided with orifices 48. Disposed for sliding on this end 47 of the rack 46 there is a bracket 49, having a cylindrical portion 50, in which is disposed a spring 51, pressing against a ball 52, for holding the said ball 52 in one of the orifices 48. The bracket 49 has an upwardly extending portion 53 with a terminal 54 which serves as a finger pointing to one of the digits 55 on the strip 56, held between the rollers 57 and 58, these rollers being journaled in bearings in a bracket 59 secured to the frame 10. The roller 57 has a stud 60, with a thumb member 61, by which it may be readily turned. With this arrangement, it is possible to introduce a strip 56 between the rollers 57 and 58, and having digits 55 thereon, indicating a number, and to dispose the finger 54 on the end 47 of the rack 46, so that it will point to the digit 55, which is disposed to the left. The pinion 45 is so geared with reference to the rack 46 that with the movement of the carriage 12 to position opposite the next column of keys 16 to the right, the finger 54 will be moved a relatively short distance, so that it will point to the next digit of the number written on the strip. In this way the finger 54 will point to the digit of the multiplier, which is to be used at the next operation of the machine while the finger 19, which moves simultaneously with the finger 54, will indicate the column of the adding machine in which the digit is to be recorded.

The numerical table is used as follows: Having to find the respective products of a given number, or rate, by each of many numbers, the work may be lessened by the use of a numerical table, consisting of the rate and the multiples thereof to 9 inclusive; the rate in such a table being set opposite the guide digit 1, twice the rate opposite the guide digit 2, and so on to 9 inclusive. For example take for the given rate the number 103. Then the numerical table may be as follows:

| Guide digits. | |
|---|---|
| 1 | 103 |
| 2 | 206 |
| 3 | 309 |
| 4 | 412 |
| 5 | 515 |
| 6 | 618 |
| 7 | 721 |
| 8 | 824 |
| 9 | 927 |

And suppose that 596 is the first of the many numbers whose respective products by the rate it is desired to find, then select from the table the number opposite the guide digits 5, 9 and 6 and arrange such selected numbers appropriately and add as follows:

515
927
618

61388 the product.

*Explanation of a method of using such a numerical table with my attachment on a Burroughs adding machine.*—The table may be placed on the card 64 (Fig. 5), or set on nine rows of dials (one of such dials is shown, Fig. 8), or, as in the preferred method, printed by the operator with the adding machine and on the regular adding machine paper. Such strip of adding machine paper, card, or dials may then be exhibited on the carriage 12. The operator makes with the adding machine a list of the numbers whose respective products by the rate it is desired to find, and inserts such list 56 between the rollers 57 and 58. If the products to result are within the capacity of the adding machine, the carriage 12 is moved until the finger 19 is over that scale figure that is one greater than the number of numerical orders in the table. Then the bracket 49 is set on the end 47 of the rack 46 in such position that the finger 54 points to the lowest numerical order on the list. Then to find the product for the first number on the list, move the carriage 12 until the finger 54 points to the left hand digit of such first listed number.

The carriage 12 has members 62, with slots 63, in which may be held a card 64, having spaces or columns on which may be marked figures of a numerical table, there being a looped finger member 65 secured to the frame 10 at 66, and having a depending member 67 extending down over the face of the card 64.

With the device shown in Fig. 10 of the drawings it is unnecessary to strike the multiplicand more than once since when the said key board which is numbered 68 is secured to the carriage, keys or plugs may be inserted in the openings 69 in the key board over the keys of the adding machine; so that when the key board 68 is pressed down the keys of the adding machine will be pressed which represent the multiplicand. When the keyboard 68 is used with the carriage, and when the carriage is moved one space to the right, the plugs or keys depending from the key board 68 will be in position to strike the keys of the adding machine again in a manner readily understood.

To facilitate the operation of the machine, I provide the frame 10 with a guideway 70, in which travels a plate 71 having numbers 72 marked thereon, indicating the units, tens, hundreds, and thousands and the spaces in which these figures 72 are marked being of the same size as the spaces 14 and 18. This plate 71 is provided so that it may be moved as desired to indicate the position of the decimal point.

A modified form of the invention is shown in Figs. 8 and 9 of the drawings. As a convenient means of indicating the multiplier and multiplicand one on the frame 10 and the other on the carriage 12, I provide plates 73, with openings 74, and a second plate 75, spaced therebelow, disks 76 being journaled in and between these plates 73 and 75, the disks 76 having numbers 77 printed thereon, which may be seen through the openings 74, and having recesses 78 in their under surface, in which engages a button 79, which is disposed through an opening 80 in the plate 75. This button 79 is held yieldingly in one of the recesses 78, by means of the spring 71. With this means several disks 76 may be rotated, so that they will indicate the multiplier or multiplicand as the case may be.

It should be understood that when the bracket 40 is moved for engaging the release key 20, the extension 39 of the lever 23 should also be moved so that it will not be engaged by the stud 37 and that when the extension 39 is moved to operative position the bracket 40 is moved out of operative position. As has been stated the extension 39 may be held in position by the set screw 23$^b$.

The operating means of my invention may, at the will of the operator, be actuated manually or by means actuated directly or indirectly by the operating means of the adding machine.

When a numerical table is used to find the product of a number by another, no number is repeated in identical numerical order of the adding machine, and the repeat key of the adding machine is not used and therefore in this process the release key 20 is never used except to make corrections.

Having thus described my invention, I claim as new and desire to secure by Letters Patent:

1. In an attachment for adding machines, a frame having a member divided into spaces on which may be marked figures, the spaces being positioned apart to be disposed substantially in alinement with the columns of keys on an adding machine, and a carriage for moving on the frame, and provided with a member divided into similar spaces.

2. In an attachment for adding machines, a frame having a member divided into spaces on which may be marked figures, the spaces being positioned apart to be disposed substantially in alinement with the columns of keys on an adding machine, a carriage for moving on the frame, and provided with a member divided into similar spaces, and a finger on the carriage extending over and beyond the first member, so that it will project in the direction of a column of keys on an adding machine, to which the attachment may be secured.

3. In an attachment for adding machines, a frame having a member divided into spaces on which may be marked figures, the spaces being positioned apart to be disposed substantially in alinement with the columns of keys on an adding machine, a carriage for moving on the frame, and provided with a member divided into similar spaces, and operating means for moving the carriage relatively to the frame one space at a time.

4. In an attachment for adding machines, a frame adapted to be secured to an adding machine, and having a member for exhibiting a factor to be used in multiplication, a carriage for moving on the frame, and having a member disposed at the first member for indicating a digit of the factor exhibited by said member.

5. In an attachment for adding machines, a frame adapted to be secured to an adding machine, and having a member for exhibiting a factor to be used in multiplication, a carriage for moving on the frame, and having a member disposed at the first member for indicating a digit of the factor exhibited by said member, and operating means for moving the carriage relatively to the frame one space at a time.

6. In an attachment for adding machines, two members, one adapted to be secured relatively to an adding machine, and the other movable relatively thereto, one of the members having a surface divided into spaces positioned apart, the other member having an extending portion for coöperating with the surface divided into spaces, and operating means for moving the carriage relatively to the frame, one space at a time.

7. In an attachment for adding machines, a frame adapted to be secured to an adding machine, and having a member for exhibiting a factor to be used in multiplication, a carriage for moving on the frame, and having a member disposed at the first member for indicating a digit of the factor exhibited by said member, operating means for moving the carriage relatively to the frame one space at a time, a lever for actuating the means, and a loop on the lever for depressing a key of the adding machine, when the lever is operated.

8. In combination with an adding machine having keys and an operating handle, a member secured to the adding machine, a second member movable relatively to the first member, having a surface divided into spaces positioned apart so that they will be substantially in alinement with columns of keys on the adding machine, the other member having an extending portion for coöperating with the surface divided into spaces, and means actuated by the operating handle, for moving the movable member one space at a time relatively to the other member.

9. In combination with an adding machine having keys, two members, one secured to the adding machine, and the other secured transversely thereof, one of the members having a surface divided into spaces positioned apart, so that they will be substantially in alinement with the columns of keys on the adding machine, the other member having an extending portion for coöperating with the surface divided into spaces.

10. In an attachment for an adding machine, a frame adapted to be secured to an adding machine and having a member divided into spaces on which may be indicated a factor to be used in multiplication, the spaces being positioned apart for alinement with the decimal columns of keys on the adding machine, a carriage for moving on the frame and having a member divided into similar spaces on which may be indicated the other factor to be used in multiplication, and means for moving the carriage on the frame one space at a time.

11. In an attachment for adding machines, a frame adapted to be secured to an adding machine and having a member divided into spaces, on which may be indicated a factor to be used in multiplication, the spaces being positioned apart for alinement with the decimal columns of keys on the adding machine, a carriage for moving on the frame and having a member divided into similar spaces, means for moving the carriage on the frame one space at a time, and a finger on the carriage extending over and beyond the first member so that it will project in the direction of a column of keys on the adding machine.

12. In combination with an adding machine having keys and a handle, a frame secured to the adding machine and having a member on which may be indicated a factor to be used in multiplication, a carriage for moving on the frame and having a member on which may be indicated a factor to be used in multiplication, and means for moving the carriage on the frame controlled by the handle.

13. In an attachment for adding machines, a frame adapted to be secured to an adding machine, a carriage movable on the frame and provided with a member projecting in the direction of a column of keys on the adding machine and exposing the keys to permit of their operation manually.

14. In an attachment for an adding machine, a frame adapted to be secured to an adding machine, a carriage movable on the frame and provided with a member projecting in the direction of a key of a numerical order of keys of an adding machine and exposing the keys to permit of their operation manually.

15. In an attachment for adding machines, a frame, a carriage for moving on the frame and provided with means for exhibiting figures and a finger on the frame disposed to hide consecutively from right to left the exhibited figures.

16. In an attachment for adding machines, a frame provided with means for exhibiting figures, a carriage for moving on the frame and a finger on the carriage disposed to hide consecutively from right to left the exhibited figures.

In testimony whereof I have signed my name to this specification in the presence of two subscribing witnesses.

HUGH E. BROWN.

Witnesses:
V. L. PALMORE,
GEORGE S. STARRETT.

Copies of this patent may be obtained for five cents each, by addressing the "Commissioner of Patents, Washington, D. C."